United States Patent
Osada et al.

(10) Patent No.: US 8,252,472 B2
(45) Date of Patent: Aug. 28, 2012

(54) FUEL CELL SYSTEM

(75) Inventors: Yasuhiro Osada, Nagoya (JP); Tetsuya Bono, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 634 days.

(21) Appl. No.: 12/447,323

(22) PCT Filed: Nov. 21, 2007

(86) PCT No.: PCT/JP2007/072996
§ 371 (c)(1),
(2), (4) Date: Apr. 27, 2009

(87) PCT Pub. No.: WO2008/069083
PCT Pub. Date: Jun. 12, 2008

(65) Prior Publication Data
US 2010/0068580 A1    Mar. 18, 2010

(30) Foreign Application Priority Data

Nov. 28, 2006  (JP) ................................. 2006-320495

(51) Int. Cl.
*H01M 8/04* (2006.01)
(52) U.S. Cl. ........ 429/446; 429/443; 429/444; 429/428; 429/512
(58) Field of Classification Search .................. 429/443, 429/444, 446, 512, 428; 251/61, 61.1, 61.2, 251/61.3, 61.4, 62, 63, 63.5, 63.6, 331; 137/488, 137/489, 489.5, 455, 491; H01M 8/04, 8/02
See application file for complete search history.

(56) References Cited

FOREIGN PATENT DOCUMENTS

| | | | |
|---|---|---|---|
| JP | 2000-003717 A | | 1/2000 |
| JP | 2000-133294 A | | 5/2000 |
| JP | 2004-006166 A | | 1/2004 |
| JP | 2004-183713 A | | 7/2004 |
| JP | 2004-185840 A | | 7/2004 |
| JP | 2005-150090 A | | 6/2005 |
| JP | 2005150090 A | * | 6/2005 |
| JP | 2005-183357 A | | 7/2005 |
| JP | 2006-049103 A | | 2/2006 |
| JP | 2006049103 A | * | 2/2006 |

* cited by examiner

OTHER PUBLICATIONS

Office Action issued in Korean Application No. 10-2009-7010828 dated Mar. 21, 2011 & partial translation thereof.

*Primary Examiner* — Jennifer Michener
*Assistant Examiner* — Heng Chan
(74) *Attorney, Agent, or Firm* — Kenyon & Kenyon LLP

(57) ABSTRACT

Fluid control valves, such as a humidifying module bypass valve, an inlet shutoff valve, an outlet shutoff valve are opened and closed by the pressure of air flowing in a fluid flow path. The pressure of air flowing in the fluid flow path is regulated, based on a drive demand pressure emitted to drive the flow control valves, by the flow rate of air discharged from an air compressor, the degree of opening of a fuel cell bypass valve, the degree of opening of an air pressure regulation valve, etc. The drive demand pressure for driving a shutoff valve is set such that, for example, the greater the absolute value of the negative pressure inside the fuel cell stack, the higher the drive demand pressure, and the air pressure is controlled to be the drive demand pressure. Since the pressure of air flowing in the fluid flow path is regulated based on a drive demand pressure of the fluid control valves, the response of drive and reliability of the fluid control valves are better than those in the case where, for example, the pressure is regulated based on a request from a fuel cell.

6 Claims, 9 Drawing Sheets

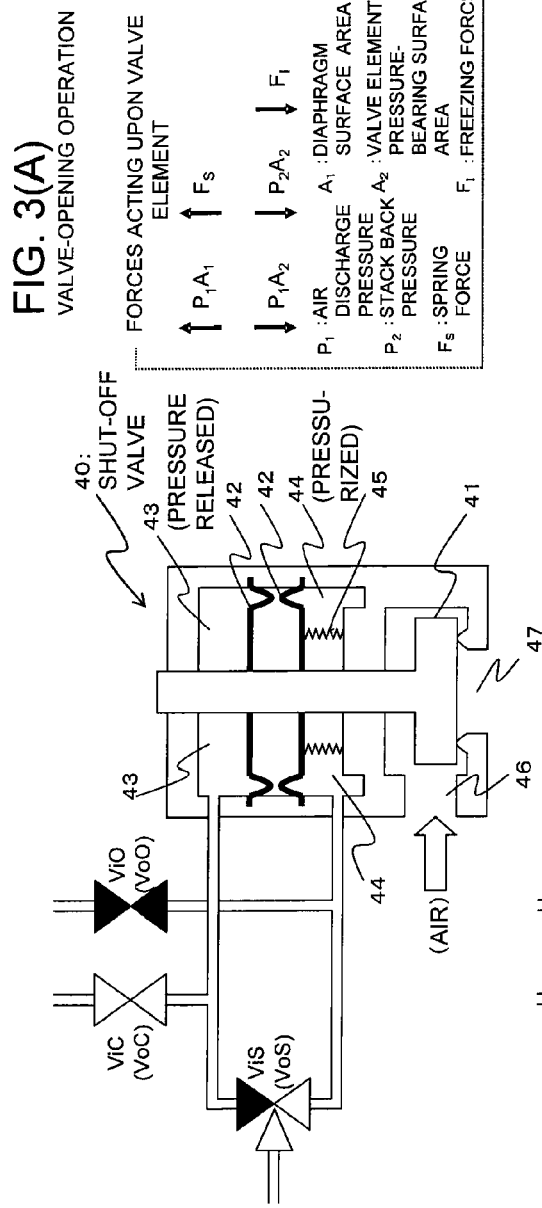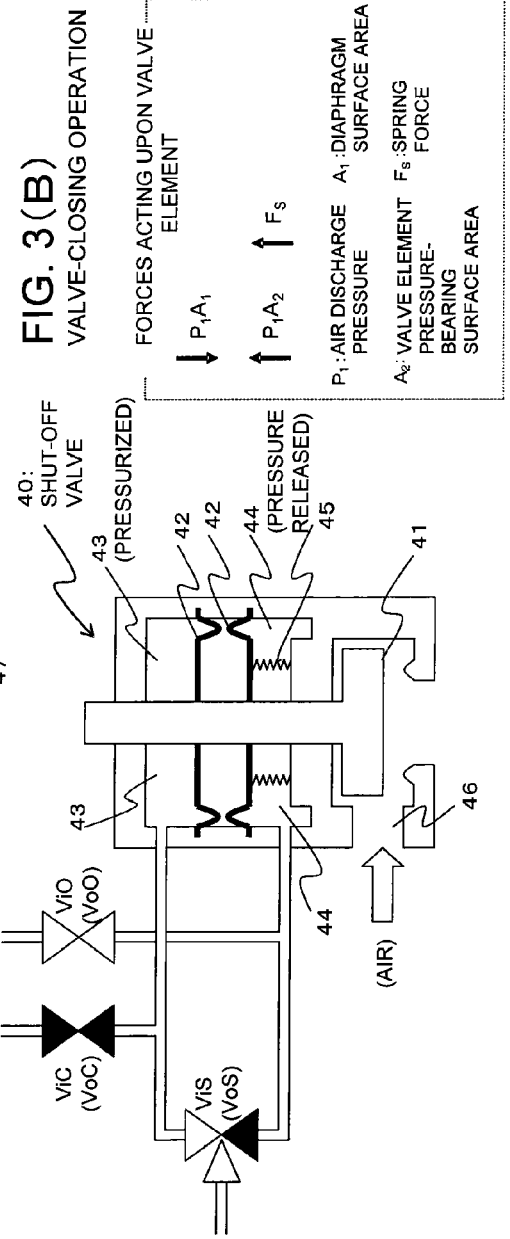

FUEL CELL SYSTEM

This is a 371 national phase application of PCT/JP2007/072996 filed 21 Nov. 2007, claiming priority to Japanese Patent Application No. JP 2006-320495 filed 28 Nov. 2006, the contents of which are incorporated herein by reference.

TECHNICAL FIELD

The present invention relates to a fuel cell system, and more particularly to a technique for driving the opening and closing of valves using the pressure of a fluid flowing through a fluid flow path.

BACKGROUND ART

Fuel cell systems that use a fuel gas such as hydrogen and an oxidizing gas such as air to generate electricity are well known. These fuel cell systems are used, for example, by mounting in a vehicle or the like as the power source for a motor used for driving the vehicle. Of course, fuel cell systems can also be used for applications other than vehicles.

A fuel cell system comprises a fuel cell that generates electricity by reacting a fuel gas with an oxidizing gas, and a fluid flow path that supplies the reactant gases, namely the fuel gas and the oxidizing gas, to the fuel cell, and discharges the reacted gases and generated water and the like from the fuel cell.

In this type of fuel cell system, a multitude of technologies have been proposed relating to the valves provided within the fluid flow path.

For example, Patent Document 1 (JP 2004-6166 A) discloses a technique for sealing a reactant gas space inside a fuel cell, by providing an opening and closing valve in each of the reactant gas supply lines and discharge lines, and closing these opening and closing valves when electric power generation by the fuel cell is stopped.

Furthermore, Patent Document 2 (JP 2000-3717 A) discloses a technique for controlling the cut-off of a gas or the like supplied to a fuel cell, by supplying air from an air compressor to control an air pilot valve.

DISCLOSURE OF INVENTION

As described above, the Patent Document 1 discloses a technique for sealing a reactant gas space inside a fuel cell by closing opening and closing valves when electric power generation by the fuel cell is stopped. However, if electromagnetic valves are used for these opening and closing valves, then in the case of a normally open electromagnetic valve, a controlling voltage must be applied continuously to the electromagnetic valve when electric power generation by the fuel cell is stopped in order to keep the electromagnetic valve closed, whereas in the case of a normally closed electromagnetic valve, a controlling voltage must be applied continuously to the electromagnetic valve during electric power generation by the fuel cell in order to keep the electromagnetic valve open, and this raises a problem of power consumption that cannot be ignored.

Furthermore, the Patent Document 2 discloses the use of an air-operated valve driven by air pressure within a fuel cell system. However, the Patent Document 2 does not provide specific technology for controlling the air pressure used to drive the air-operated valve.

Against this background, the inventors of the present invention have conducted continued research and development relating to controlling the open and closed states of valves provided within the fluid flow path of a fuel cell system. In particular, the inventors have conducted continued research into technology for opening and closing the valves using the pressure of a fluid flowing through the fluid flow path.

The present invention has been developed as a result of this research and development, and has an advantage of providing technology for controlling the pressure of a fluid used for driving a valve.

In order to realize the above advantage, a fuel cell system of a preferred aspect of the present invention comprises a fuel cell, a fluid flow path connected to the fuel cell, and a fluid control valve provided within the fluid flow path, wherein the fluid control valve is a valve that is opened and closed using the pressure of a fluid flowing through the fluid flow path, and the pressure of the fluid flowing through the fluid flow path is regulated based on a drive demand pressure that is required for driving the fluid control valve.

According to this configuration, because the operations of opening and closing the fluid control valve can be performed by regulating the pressure of the fluid flowing through the fluid flow path, the power consumption associated with opening and closing the fluid control valve can be reduced, for example when compared with the case where an electromagnetic valve is used as the fluid control valve. Furthermore, because the fluid pressure is regulated based on the drive demand pressure for the fluid control valve, the response and reliability of the driving of the fluid control valve improves, for example when compared with the case where the fluid pressure is regulated in accordance with the requirements of the fuel cell.

In a preferred aspect of the fuel cell system, when the fluid control valve is opened, the pressure of the fluid flowing through the fluid flow path is regulated based on a drive demand pressure that is commensurate with the pressure inside the fuel cell. As a result, even in those cases where the size of the negative pressure inside the fuel cell fluctuates, because the pressure of the fluid flowing through the fluid flow path is regulated in accordance with those negative pressure fluctuations, the stability and the like of the valve opening operation for the fluid control valve is improved. For example, fluctuations in the time required for opening the fluid control valve can be reduced.

In another preferred aspect of the fuel cell system, the pressure of the fluid flowing through the fluid flow path is regulated based on a cell demand pressure that is required by the fuel cell and the aforementioned drive demand pressure, and during driving of the fluid control valve, the drive demand pressure is given priority over the cell demand pressure, so that the pressure of the fluid flowing through the fluid flow path is regulated based on the drive demand pressure. As a result, for example, during electric power generation by the fuel cell, the fluid pressure is regulated so as to provide a pressure that is appropriate for electric power generation by the fuel cell, whereas during driving of the fluid control valve, the fluid pressure is regulated so as to provide a pressure that is appropriate for driving the fluid control valve.

In yet another preferred aspect of the fuel cell system, when purging of the fuel cell is started, the drive demand pressure is given priority over the cell demand pressure, so that the pressure of the fluid flowing through the fluid flow path is regulated based on the drive demand pressure, and the fluid control valve is switched to an open or closed state that is appropriate for purging.

In yet another preferred aspect of the fuel cell system, following switching of the fluid control valve to an open or closed state that is appropriate for purging, a pressure chamber of the fluid control valve is sealed, and the open or closed state of the fluid control valve is maintained using the pressure inside the pressure chamber.

In yet another preferred aspect, the fuel cell system further comprises a compressor that circulates a fluid through the fluid flow path, and a pressure regulation valve provided within the fluid flow path, wherein the pressure of the fluid flowing through the fluid flow path is regulated by at least one of the discharge flow rate from the compressor and the degree of valve opening of the pressure regulation valve.

The present invention provides technology for controlling the pressure of a fluid used for driving a valve. For example, in a preferred aspect of the present invention, the power consumption required for opening and closing the valve can be reduced. Furthermore, in a preferred aspect of the present invention, the response and reliability of the driving of the fluid control valve can be improved.

BRIEF DESCRIPTION OF THE DRAWINGS

FIG. 3 is a diagram describing the opening and closing operations of the shut-off valve.

BEST MODE FOR CARRYING OUT THE INVENTION

Preferred embodiments of the present invention are described below based on the drawings.

Figure 1:
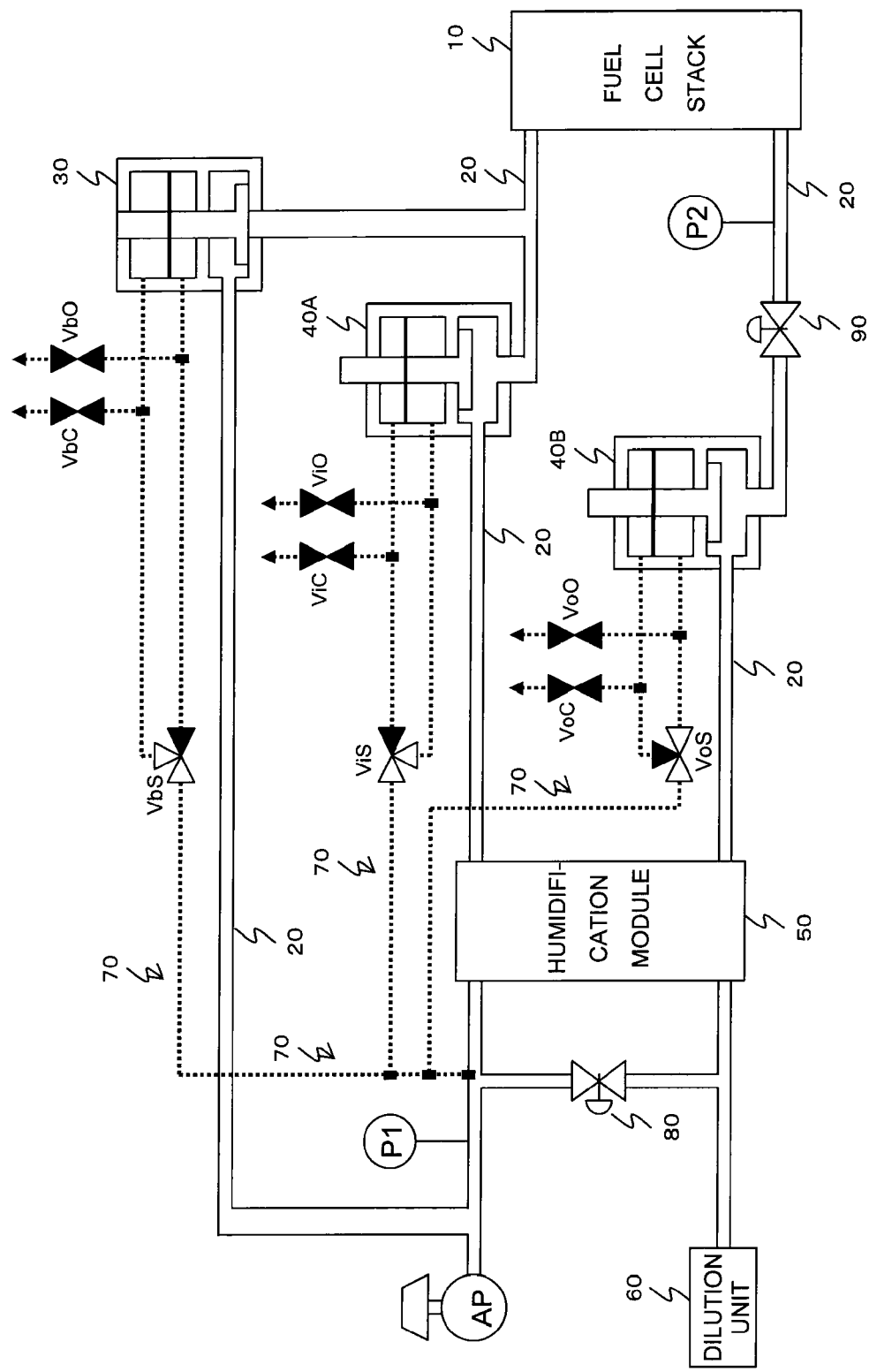
FIG. 1 is an overall structural diagram illustrating a fuel cell system according to the present invention.

FIG. 1 is an overall structural diagram illustrating a preferred embodiment of a fuel cell system according to the present invention. The fuel cell system of FIG. 1 comprises a fuel cell stack 10 and a fluid flow path 20 and the like, and a humidification module bypass valve (humidification M bypass valve) 30, an inlet shutoff valve 40A and an outlet shutoff valve 40B that function as fluid control valves are provided within the fluid flow path 20. Moreover, a fuel cell bypass valve 80 and an air pressure regulation valve 90 that function as pressure regulation valves are also provided within the fluid flow path 20.

The fuel cell stack 10 generates electricity by reacting a fuel gas comprising hydrogen or the like with an oxidizing gas comprising oxygen or the like. In other words, the fuel gas and the oxidizing gas are supplied to the fuel cell stack 10, and electrical energy is obtained by reacting the fuel gas and the oxidizing gas within a plurality of individual electrical cells (not shown in the drawing) inside the fuel cell stack 10. These individual electrical cells are, for example, substantially rectangular plate-shaped cells, and the fuel cell stack 10 is formed by stacking a plurality of these plate-shaped electrical cells. Each individual electrical cell may also be a cylindrical shape, for example.

The fuel cell system of the present embodiment is mounted, for example, within a vehicle, and the fuel cell stack 10 is used as the power source for the motor that drives the vehicle. Of course, the fuel cell system of the present embodiment may also be incorporated within an apparatus or system other than a vehicle.

The fluid flow path 20 functions as the path for supplying the reactant gases to the fuel cell stack 10. In other words, one of the reactant gases (for example, the air used as the oxidizing gas) is supplied to the fuel cell stack 10 via the fluid flow path 20. Furthermore, the fluid flow path 20 also functions as a path for discharging the reacted gases and generated water and the like from the fuel cell stack 10. A fluid path for supplying the other reactant gas (for example, hydrogen gas) is also connected to the fuel cell stack 10, but this path is omitted from FIG. 1.

The humidification M bypass valve 30, the inlet shutoff valve 40A and the outlet shutoff valve 40B function as fluid control valves that regulate the flow of air through the fluid flow path 20. To each of these three fluid control valves, three PSV (Pressure Switching Valves) are connected via a pressure control path 70.

In other words, three PSVs labeled VbS, VbC and VbO are connected to the humidification M bypass valve 30. Further, three PSVs labeled ViS, ViC and ViO are connected to the inlet shutoff valve 40A, and three PSVs labeled VoS, VoC and VoO are connected to the outlet shutoff valve 40B. These PSVs are connected, via the pressure control path 70, to the upstream side of the fluid flow path 20, for example at a point between an air compressor (AP) and a humidification module 50. Further, these PSVs are controlled, for example, by a control unit not shown in the drawing.

The humidification M bypass valve 30, the inlet shutoff valve 40A and the outlet shutoff valve 40B are each controlled by their corresponding PSVs. In the present embodiment, the humidification M bypass valve 30, the inlet shutoff valve 40A and the outlet shutoff valve 40B are controlled in accordance with factors such as the state of the fuel cell stack 10. The control of each of the valves is described below in detail.

Next is a description of the air flow within the fluid flow path 20. The air that flows through the fluid flow path 20 is introduced into the fluid flow path 20 from the air compressor (AP). The air compressor feeds air from the atmosphere into the fluid flow path 20, for example via an air cleaner (not shown in the drawing). The air discharged from the air compressor is supplied to the humidification module 50, the humidification M bypass valve 30, and the fuel cell bypass valve 80.

The humidification module 50 regulates the humidity of the air flowing through the fluid flow path 20. In other words, for example, the humidification module 50 humidifies the air to achieve a humidity that is ideal for the chemical reaction that occurs within the fuel cell stack 10. The humidity-regulated air then passes through the inlet shutoff valve 40A and is supplied to the fuel cell stack 10.

A route also exists for supplying the air to the fuel cell stack 10 without passage through the humidification module 50. Namely, a route exists in which air is supplied from the air compressor, via the humidification M bypass valve 30, to the fuel cell stack 10, and the air that passes through this route is supplied to the fuel cell stack 10 without having undergone humidity regulation.

The air supplied to the fuel cell bypass valve 80 is not supplied to the fuel cell stack 10, but is rather released into the atmosphere via a dilution unit 60. The fuel cell bypass valve 80 is used for controlling the pressure (discharge pressure) of the air supplied to the fuel cell stack 10. In other words, the air pressure inside the fluid flow path 20 at the location of a pressure meter P1 is regulated by controlling the degree of valve opening of the fuel cell bypass valve 80. Alternatively, the discharge pressure may be controlled by regulating the air flow rate discharged from the air compressor (AP). Of course, the discharge pressure may also be controlled using both the degree of valve opening of the fuel cell bypass valve 80 and the air flow rate from the air compressor.

The gas discharged from the fuel cell stack 10 (namely, the reacted air) is fed to the air pressure regulation valve 90. The air pressure regulation valve 90 is used for controlling the pressure of the air discharged from the fuel cell stack 10 (namely, the back pressure). In other words, the air pressure inside the fluid flow path 20 at the location of a pressure meter P2 is regulated by controlling the degree of valve opening of the air pressure regulation valve 90. The back pressure is controlled, for example, so as to obtain a target value that enables efficient electric power generation by the fuel cell stack 10.

Because regulating the back pressure also regulates the pressure inside the fluid flow path 20, the air pressure regulation valve 90 also has a role as a pressure regulation valve for regulating the air pressure inside the fluid flow path 20.

The air output from the air pressure regulation valve 90 passes through the outlet shutoff valve 40B, the humidification module 50 and the dilution unit 60, before being released into the atmosphere.

Next is a detailed description of the humidification M bypass valve 30, the inlet shutoff valve 40A and the outlet shutoff valve 40B, using FIG. 2 to FIG. 5. First is a description of the inlet shutoff valve 40A and the outlet shutoff valve 40B using FIG. 2 and FIG. 3.

Figure 2:
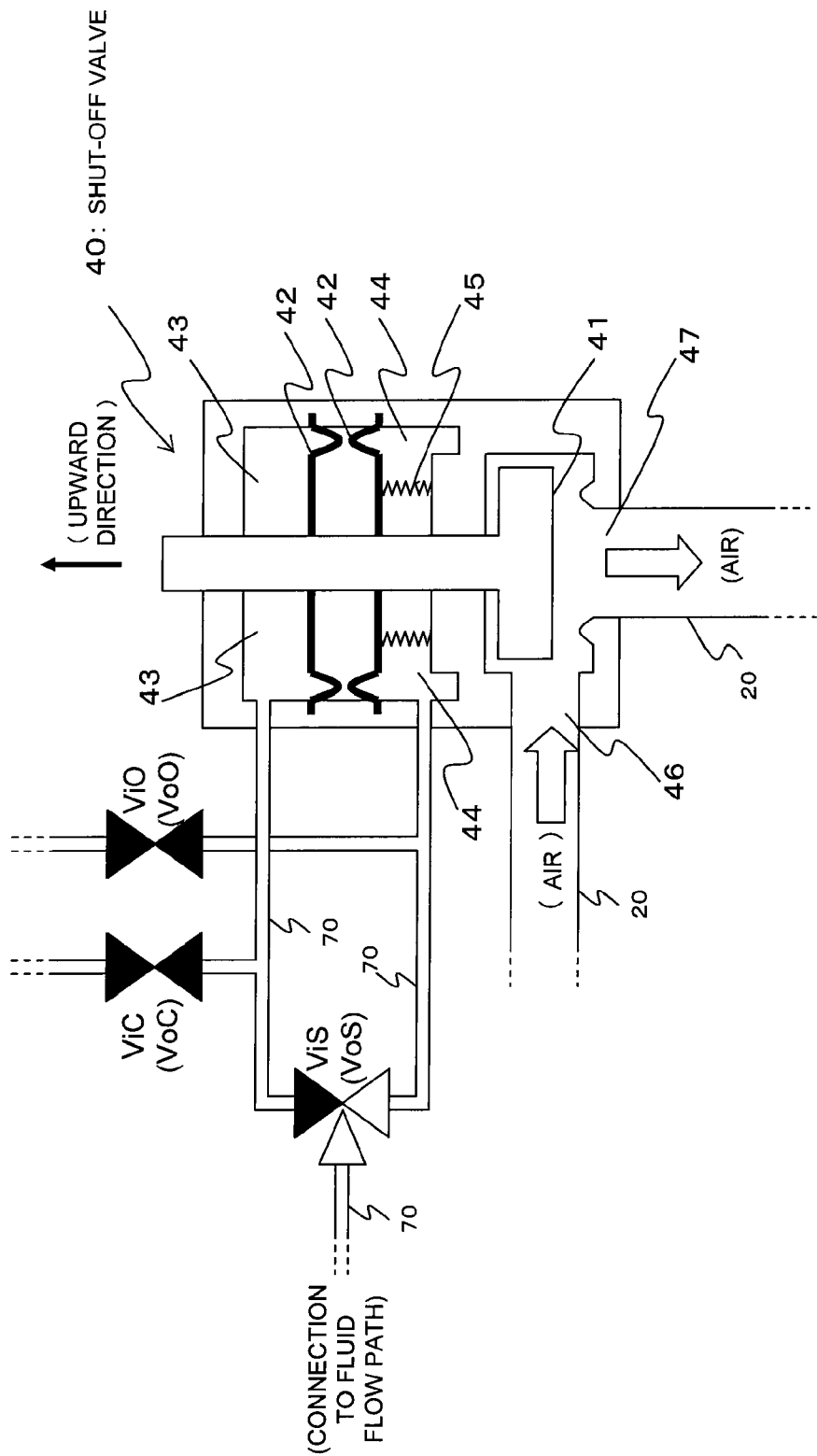
FIG. 2 is a diagram describing the structure of a shut-off valve.

FIG. 2 is a diagram describing the structure of a shut-off valve 40 (the inlet shutoff valve 40A and the outlet shutoff valve 40B in FIG. 1). The shut-off valve 40 is a normally open valve, so that in a normal state, the valve-opening pressure is greater than the valve-closing pressure, meaning a valve element 41 is positioned in an open state.

The shut-off valve 40 comprises a diaphragm 42, wherein a valve-closing pressure chamber 43 is provided on the upper side of the diaphragm 42, and a valve-opening pressure chamber 44 is provided on the underside of the diaphragm 42.

The diaphragm 42 is displaced in the upward or downward direction shown in the drawing in accordance with the pressure difference between the pressure inside the valve-closing pressure chamber 43 and the pressure inside the valve-opening pressure chamber 44. For example, in FIG. 2, the left and right edges of the diaphragm 42 are fixed, and the central portion of the diaphragm 42 is displaced via an up and down warping-type movement. Of course, a configuration in which the entire diaphragm 42 is displaced up and down may also be adopted. When the diaphragm 42 is displaced, the valve element 41 connected to the diaphragm 42 is also displaced. As a result, the degree of valve opening for the shut-off valve 40 is regulated by the displacement of the diaphragm 42.

For example, by driving the valve element 41 upward via a displacement of the diaphragm 42, the air flowing from the fluid flow path 20 toward an inlet 46 of the shut-off valve 40 can be discharged into the fluid flow path 20 from an outlet 47 of the shut-off valve 40. On the other hand, by closing the outlet 47 by driving the valve element 41 downward via a displacement of the diaphragm 42, the air flow traveling from the fluid flow path 20 on the inlet 46 side toward the fluid flow path 20 on the outlet 47 side is blocked.

Springs 45 are provided on the underside of the diaphragm 42, and an upward spring force is applied to the diaphragm 42.

The pressure inside the valve-closing pressure chamber 43 and the pressure inside the valve-opening pressure chamber 44 are controlled by three PSVs. Namely, if the shut-off valve 40 is an inlet shutoff valve (symbol 40A in FIG. 1), then the pressure inside each of the pressure chambers is controlled by the three PSVs labeled ViS, ViC and ViO. Similarly, if the shut-off valve 40 is an outlet shutoff valve (symbol 40B in FIG. 1), then the pressure inside each of the pressure chambers is controlled by the three PSVs labeled VoS, VoC and VoO.

ViS (or VoS) is a 3-way PSV, and functions as a 3-way valve that selectively connects one of the two pressure chambers, namely either the valve-closing pressure chamber 43 or the valve-opening pressure chamber 44, to the fluid flow path 20. In other words, ViS connects the pressure control path 70 that leads to the fluid flow path 20 with either the pressure control path 70 that leads to the valve-closing pressure chamber 43 or the pressure control path 70 that leads to the valve-opening pressure chamber 44.

ViS may be an electromagnetic valve for example, wherein the connection state is altered by passing a current through the valve. In an uncontrolled state, namely in the absence of an electric current (the unenergized state), ViS selects the valve-opening pressure chamber 44. In other words, in the unenergized state, ViS connects the pressure control path 70 that leads to the fluid flow path 20 with the pressure control path 70 that leads to the valve-opening pressure chamber 44. In contrast, in a controlled state, namely when a current is supplied (the energized state), ViS selects the valve-closing pressure chamber 43. In other words, in the energized state, ViS connects the pressure control path 70 that leads to the fluid flow path 20 with the pressure control path 70 that leads to the valve-closing pressure chamber 43.

ViC (or VoC) is a 2-way PSV, and functions as a pressure release valve for reducing the pressure inside the valve-closing pressure chamber 43. One side of ViC is connected to the pressure control path 70 that leads to the valve-closing pressure chamber 43, and the other side of ViC is open to the atmosphere.

ViC may be an electromagnetic valve for example, wherein the open or closed state is altered by passing a current through the valve. In an uncontrolled state, namely in the absence of an electric current (the unenergized state), ViC maintains a closed state. Accordingly, when ViC is in the unenergized state, a path that links the inside of the valve-closing pressure chamber 43 to the atmosphere is blocked. In contrast, ViC opens in a controlled state, namely when a current is supplied (the energized state). Accordingly, when ViC is in the energized state, a path is formed that links the inside of the valve-closing pressure chamber 43 to the atmosphere.

ViO (or VoO) is a 2-way PSV, and functions as a pressure release valve for reducing the pressure inside the valve-opening pressure chamber 44. One side of ViO is connected to the pressure control path 70 that leads to the valve-opening pressure chamber 44, and the other side of ViO is open to the atmosphere.

ViO may be an electromagnetic valve for example, wherein the open or closed state is altered by passing a current through the valve. In an uncontrolled state, namely in the absence of an electric current (the unenergized state), ViO maintains a closed state. Accordingly, when ViO is in the unenergized state, a path that links the inside of the valve-opening pressure chamber 44 to the atmosphere is blocked. In contrast, ViO opens in a controlled state, namely when a current is supplied (the energized state). Accordingly, when ViO is in the energized state, a path is formed that links the inside of the valve-opening pressure chamber 44 to the atmosphere.

In the drawings used for describing the present embodiment, of the plurality of triangles that are used to represent ViS (VoS), ViC (VoC) and ViO (VoO), the filled black triangles indicate a closed state for the pressure control path 70, whereas the unfilled white triangles indicate an open state for the pressure control path 70.

For example, the filled black triangles shown in FIG. 2 indicate that ViS (or VoS) is in a state (an unenergized state) where the pressure control path 70 that leads to the valve-closing pressure chamber 43 is closed, whereas the pressure control path 70 that leads to the fluid flow path 20 and the pressure control path 70 that leads to the valve-opening pressure chamber 44 are connected. Further, in FIG. 2, the triangle that represents ViC (or VoC) is filled, indicating that ViC (or VoC) is in a closed state (unenergized state). Similarly, in FIG. 2, the triangle that represents ViO (or VoO) is filled, indicating that ViO (or VoO) is also in a closed state (unenergized state).

FIG. 3 is a diagram describing the opening and closing operations for the shut-off valve 40 (the inlet shutoff valve 40A and the outlet shutoff valve 40B in FIG. 1).

FIG. 3 (A) is a diagram describing the valve opening operation for the shut-off valve 40. That is, the diagram describes the operation of moving the lowered and closed valve element 41 in an upward direction to open the valve.

To open the shut-off valve 40, ViS (or VoS) is set to an unenergized state, thereby connecting the valve-opening pressure chamber 44 and the fluid flow path (symbol 20 in FIG. 1). Further, ViO (or VoO) is set to an unenergized state, thereby blocking the path that links the inside of the valve-opening pressure chamber 44 to the atmosphere. Moreover, ViC (or VoC) is set to an energized state, thereby forming a path that links the inside of the valve-closing pressure chamber 43 to the atmosphere, and effecting pressure release from the valve-closing pressure chamber 43.

In this state, the forces described below act upon the valve element 41 of the shut-off valve 40. Firstly, if the discharge pressure from the air compressor (AP in FIG. 1) is termed $P_1$ and the surface area of the diaphragm 42 is termed $A_1$, then because the valve-opening pressure chamber 44 and the fluid flow path (symbol 20 in FIG. 1) are connected, the inside of the valve-opening pressure chamber 44 is pressurized to a pressure of $P_1$, and an upward force of $P_1A_1$ acts upon the valve element 41 via the diaphragm 42.

Further, because air (pressure $P_1$) enters the valve from the inlet 46 of the shut-off valve 40 and applies pressure directly to the valve element 41, if the pressure-bearing surface area of the valve element 41 is termed $A_2$, then a downward force of $P_1A_2$ also acts upon the valve element 41. Furthermore, if the negative pressure inside the fuel cell stack (symbol 10 in FIG. 1) is termed $P_2$, then because this negative pressure applies a force to the valve element 41 from the outlet 47 of the shut-off valve 40, if the pressure-bearing surface area of the valve element 41 is termed $A_2$, then a downward force of $P_2A_2$ also acts upon the valve element 41.

Moreover, the springs 45 cause an additional upward force $F_S$ to act on the valve element 41 via the diaphragm 42, and if forces such as freezing that cause the valve element 41 to stick to a portion of the outlet 47 are taken into consideration, then an additional downward freezing force $F_1$ also acts upon the valve element 41.

Accordingly, in order to move the valve element 41 upward and open the valve, the relationship between the upward and downward forces acting upon the valve element 41 must satisfy the expression:

$$P_1A_1 + F_S > P_1A_2 + P_2A_2 + F_1 \quad (1).$$

In the present embodiment, the drive demand pressure for driving the shut-off valve 40 is set so as to ensure that the relationship of formula (1) is satisfied. Then, during opening of the shut-off valve 40, the air discharge pressure $P_1$ is controlled so as to achieve the drive demand pressure.

The air discharge pressure $P_1$ is controlled by the degree of valve opening of the fuel cell bypass valve (symbol 80 in FIG. 1) and the air flow rate from the air compressor (AP in FIG. 1). The air discharge pressure $P_1$ may also be controlled using the degree of valve opening of the air pressure regulation valve (symbol 90 in FIG. 1).

As shown in formula (1), a downward force $P_2A_2$ generated as a result of the negative pressure $P_2$ inside the fuel cell stack acts upon the valve element 41. The negative pressure $P_2$ inside the fuel cell stack fluctuates under the effect of factors such as the temperature and the standing time that has elapsed since stopping power generation by the fuel cell stack.

Accordingly, in the present embodiment, the air discharge pressure $P_1$ is controlled in accordance with the negative pressure $P_2$ inside the fuel cell stack. For example, the smaller the negative pressure 22 (namely, the greater the absolute value of the negative pressure $P_2$), the larger the value that is set for the drive demand pressure for driving the shut-off valve 40, wherein the air discharge pressure $P_1$ is controlled so as to achieve the drive demand pressure.

As a result, in the present embodiment, the variation in the valve opening time for the shut-off valve 40 that accompanies fluctuations in the negative pressure inside the fuel cell stack can be reduced significantly compared with the case where the air discharge pressure is set to a constant value. Of course, control may also be conducted so that the valve opening time becomes constant.

Furthermore, in the present embodiment, in those cases where the negative pressure inside the fuel cell stack fluctuates, the shut-off valve 40 can still be opened with improved reliability. In this manner, in the present embodiment, because the air discharge pressure is controlled in accordance with the negative pressure inside the fuel cell stack, a more stable valve opening operation can be realized.

FIG. 3 (B) is a diagram describing the valve closing operation for the shut-off valve 40. That is, the diagram describes the operation of moving the raised and open valve element 41 in a downward direction to close the valve.

To close the shut-off valve 40, ViS (or VoS) is set to an energized state, thereby connecting the valve-closing pressure chamber 43 and the fluid flow path (symbol 20 in FIG. 1). Further, ViO (or VoO) is set to an unenergized state, thereby blocking the path that links the inside of the valve-closing pressure chamber 43 to the atmosphere. Moreover, ViO (or VoO) is set to an energized state, thereby forming a path that links the inside of the valve-opening pressure chamber 44 to the atmosphere, and effecting pressure release from the valve-opening pressure chamber 44.

In this state, the forces described below act upon the valve element 41 of the shut-off valve 40. Firstly, if the discharge pressure from the air compressor (AP in FIG. 1) is termed $P_1$ and the surface area of the diaphragm 42 is termed $A_1$, then because the valve-closing pressure chamber 43 and the fluid flow path (symbol 20 in FIG. 1) are connected, the inside of the valve-closing pressure chamber 43 is pressurized to a pressure of $P_1$, and a downward force of $P_1A_1$ acts upon the valve element 41 via the diaphragm 42.

Further, because air (pressure $P_1$) from the inlet 46 of the shut-off valve 40 enters the valve and applies pressure directly to the valve element 41, if the pressure-bearing surface area of the valve element 41 is termed $A_2$, then an upward force of $P_1A_2$ also acts upon the valve element 41. Furthermore, the springs 45 cause an additional upward force $F_S$ to act on the valve element 41 via the diaphragm 42.

Accordingly, in order to move the valve element 41 downward and close the valve, the relationship between the upward and downward forces acting upon the valve element 41 must satisfy the expression:

$$P_1A_1 > P_1A_2 + F_S \quad (2).$$

The air discharge pressure $P_1$ or the like is set so as to ensure that the relationship of formula (2) is satisfied. Alternatively, the drive demand pressure for driving the shut-off valve 40 may be set so as to ensure that the relationship of formula (2) is satisfied, and the air discharge pressure $P_1$ then controlled so as to achieve the drive demand pressure.

In FIG. 2 and FIG. 3, a shut-off valve 40 having two pressure chambers was described, but for example, a valve having only the valve-closing pressure chamber 43 may also be used. In this configuration, to close the shut-off valve 40, the valve-closing pressure chamber 43 is pressurized to achieve a force relationship that moves the valve element 41 downward, whereas to open the shut-off valve 40, the pressure is released from the valve-closing pressure chamber 43, and the force of the springs 45 and the pressure of the air entering from the inlet 46 generates a force relationship that moves the valve element 41 upward.

Figure 4:
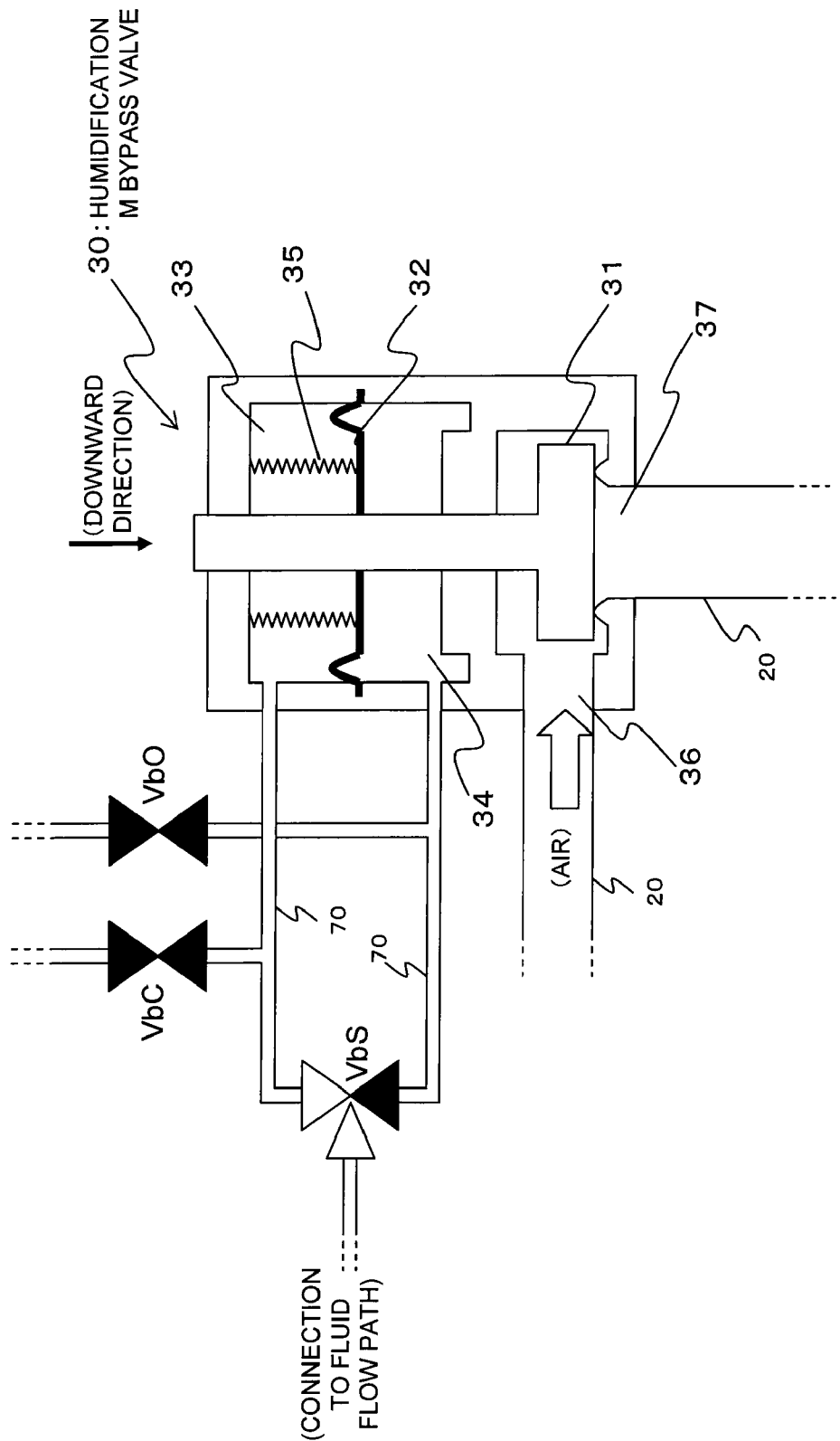
FIG. 4 is a diagram describing the structure of a humidification module bypass valve.
Figure 5:
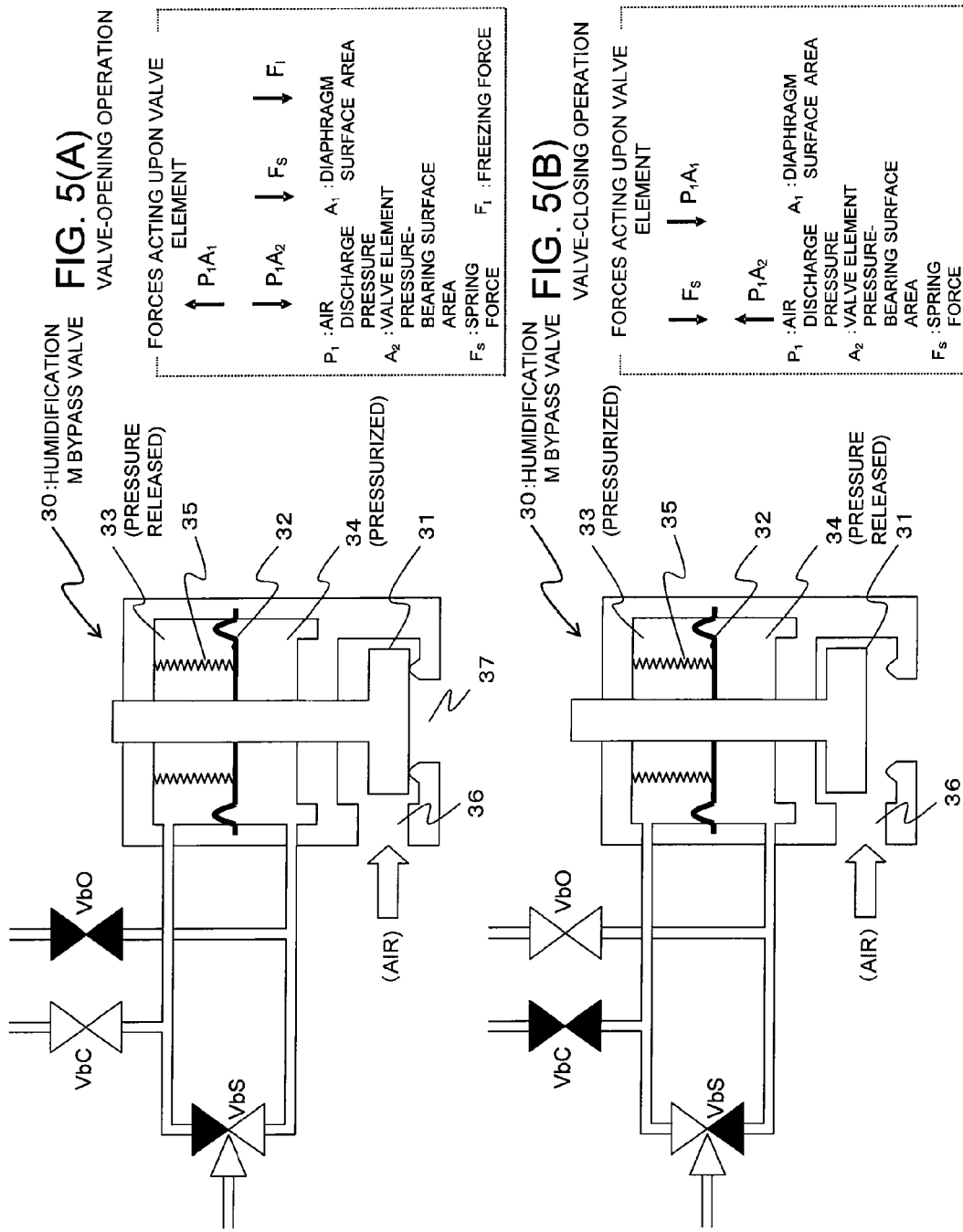
FIG. 5 is a diagram describing the opening and closing operations of the humidification module bypass valve.

Next is a description of the humidification M bypass valve 30 using FIG. 4 and FIG. 5. FIG. 4 is a diagram describing the structure of the humidification module bypass valve 30. The humidification M bypass valve 30 is a normally closed valve, so that in a normal state, the valve-closing pressure is greater than the valve-opening pressure, meaning a valve element 31 is positioned in a closed state.

The shut-off valve 30 comprises a diaphragm 32, wherein a valve-closing pressure chamber 33 is provided on the upper side of the diaphragm 42, and a valve-opening pressure chamber 34 is provided on the underside of the diaphragm 32.

The diaphragm 32 is displaced in the upward or downward direction shown in the drawing in accordance with the pressure difference between the pressure inside the valve-closing pressure chamber 33 and the pressure inside the valve-opening pressure chamber 34. For example, in FIG. 4, the left and right edges of the diaphragm 32 are fixed, and the central portion of the diaphragm 32 is displaced via an up and down warping-type movement. Of course, a configuration in which the entire diaphragm 32 is displaced up and down may also be adopted. When the diaphragm 32 is displaced, the valve element 31 connected to the diaphragm 32 is also displaced. As a result, the degree of valve opening for the humidification M bypass valve 30 is regulated by the displacement of the diaphragm 32.

For example, by driving the valve element 31 upward via a displacement of the diaphragm 32, the air flowing from the fluid flow path 20 toward an inlet 36 of the humidification M bypass valve 30 can be discharged into the fluid flow path 20 from an outlet 37 of the humidification M bypass valve 30. On the other hand, by closing the outlet 37 by driving the valve element 31 downward via a displacement of the diaphragm 32, the air flow traveling from the fluid flow path 20 on the inlet 36 side toward the fluid flow path 20 on the outlet 37 side is blocked.

Springs 35 are provided on the upper side of the diaphragm 32, and an downward spring force is applied to the diaphragm 32.

The pressure inside the valve-closing pressure chamber 33 and the pressure inside the valve-opening pressure chamber 34 are controlled by three PSVs. Namely, the pressure inside each of the pressure chambers is controlled by the three PSVs labeled VbS, VbC and VbO.

VbS is a 3-way PSV, and functions as a 3-way valve that selectively connects one of the two pressure chambers, namely either the valve-closing pressure chamber 33 or the valve-opening pressure chamber 34, to the fluid flow path 20. In other words, VbS connects the pressure control path 70 that leads to the fluid flow path 20 with either the pressure control path 70 that leads to the valve-closing pressure chamber 33 or the pressure control path 70 that leads to the valve-opening pressure chamber 34.

VbS may be an electromagnetic valve for example, wherein the connection state is altered by passing a current through the valve. In an uncontrolled state, namely in the absence of an electric current (the unenergized state), VbS selects the valve-closing pressure chamber 33. In other words, in the unenergized state, VbS connects the pressure control path 70 that leads to the fluid flow path 20 with the pressure control path 70 that leads to the valve-closing pressure chamber 33. In contrast, in a controlled state, namely when a current is supplied (the energized state), VbS selects the valve-opening pressure chamber 34. In other words, in the energized state, VbS connects the pressure control path 70 that leads to the fluid flow path 20 with the pressure control path 70 that leads to the valve-opening pressure chamber 34.

VbC is a 2-way PSV, and functions as a pressure release valve for reducing the pressure inside the valve-closing pressure chamber 33. One side of VbC is connected to the pressure control path 70 that leads to the valve-closing pressure chamber 33, and the other side of VbC is open to the atmosphere.

VbC may be an electromagnetic valve for example, wherein the open or closed state is altered by passing a current through the valve. In an uncontrolled state, namely in the absence of an electric current (the unenergized state), VbC maintains a closed state. Accordingly, when VbC is in the unenergized state, a path that links the inside of the valve-closing pressure chamber 33 to the atmosphere is blocked. In contrast, VbC opens in a controlled state, namely when a current is supplied (the energized state). Accordingly, when VbC is in the energized state, a path is formed that links the inside of the valve-closing pressure chamber 33 to the atmosphere.

VbO is a 2-way PSV, and functions as a pressure release valve for reducing the pressure inside the valve-opening pressure chamber 34. One side of VbO is connected to the pressure control path 70 that leads to the valve-opening pressure chamber 34, and the other side of VbO is open to the atmosphere.

VbO may be an electromagnetic valve for example, wherein the open or closed state is altered by passing a current through the valve. In an uncontrolled state, namely in the absence of an electric current (the unenergized state), VbO maintains a closed state. Accordingly, when VbO is in the unenergized state, a path that links the inside of the valve-opening pressure chamber 34 to the atmosphere is blocked. In contrast, VbO opens in a controlled state, namely when a current is supplied (the energized state). Accordingly, when VbO is in the energized state, a path is formed that links the inside of the valve-opening pressure chamber 34 to the atmosphere.

In the drawings used for describing the present embodiment, of the plurality of triangles that are used to represent VbS, VbC and VbO, the filled black triangles indicate a closed state for the pressure control path 70, whereas the unfilled white triangles indicate an open state for the pressure control path 70.

For example, the filled black triangles shown in FIG. 4 indicate that VbS is in a state (an unenergized state) where the pressure control path 70 that leads to the valve-opening pressure chamber 34 is closed, whereas the pressure control path 70 that leads to the fluid flow path 20 and the pressure control path 70 that leads to the valve-closing pressure chamber 33 are connected. Further, in FIG. 4, the triangle that represents VbC is filled, indicating that VbC is in a closed state (unenergized state). Similarly, in FIG. 4, the triangle that represents VbO is filled, indicating that VbO is also in a closed state (unenergized state).

FIG. 5 is a diagram describing the opening and closing operations of the humidification M bypass valve 30. FIG. 5 (A) is a diagram describing the valve opening operation for the humidification M bypass valve 30. That is, the diagram describes the operation of moving the lowered and closed valve element 31 in an upward direction to open the valve.

To open the humidification M bypass valve 30, VbS is set to an energized state, thereby connecting the valve-opening pressure chamber 34 and the fluid flow path (symbol 20 in FIG. 1). Further, VbO is set to an unenergized state, thereby blocking the path that links the inside of the valve-opening pressure chamber 34 to the atmosphere. Moreover, VbC is set to an energized state, thereby forming a path that links the inside of the valve-closing pressure chamber 33 to the atmosphere, and effecting pressure release from the valve-closing pressure chamber 33.

In this state, the forces described below act upon the valve element 31 of the humidification M bypass valve 30. Firstly, if the discharge pressure from the air compressor (AP in FIG. 1) is termed $P_1$ and the surface area of the diaphragm 32 is termed $A_1$, then because the valve-opening pressure chamber 34 and the fluid flow path (symbol 20 in FIG. 1) are connected, the inside of the valve-opening pressure chamber 34 is pressurized to a pressure of $P_1$, and an upward force of $P_1 A_1$ acts upon the valve element 31 via the diaphragm 32.

Further, because air (pressure $P_1$) enters the valve from the inlet 36 of the humidification M bypass valve 30 and applies pressure directly to the valve element 31, if the pressure-bearing surface area of the valve element 31 is termed $A_2$, then a downward force of $P_1 A_2$ also acts upon the valve element 31. Furthermore, the springs 35 cause an additional downward force $F_s$ to act on the valve element 31 via the diaphragm 32, and if forces such as freezing that cause the valve element 31 to stick to a portion of the outlet 37 are taken into consideration, then an additional downward freezing force $F_1$ also acts upon the valve element 31.

Accordingly, in order to move the valve element 31 upward and open the valve, the relationship between the upward and downward forces acting upon the valve element 31 must satisfy the expression:

$$P_1 A_1 > P_1 A_2 + F_S + F_1 \qquad (3).$$

The air discharge pressure $P_1$ or the like is set to ensure that the relationship of formula (3) is satisfied. Alternatively, the drive demand pressure for driving the humidification M bypass valve 30 may be set so as to ensure that the relationship of formula (3) is satisfied, and the air discharge pressure $P_1$ then controlled so as to achieve the drive demand pressure.

FIG. 5 (B) is a diagram describing the valve closing operation for the humidification M bypass valve 30. That is, the diagram describes the operation of moving the raised and open valve element 31 in a downward direction to close the valve.

To close the humidification M bypass valve 30, VbS is set to an unenergized state, thereby connecting the valve-closing pressure chamber 33 and the fluid flow path (symbol 20 in FIG. 1). Further, VbC is set to an unenergized state, thereby blocking the path that links the inside of the valve-closing pressure chamber 33 to the atmosphere. Moreover, VbO is set to an energized state, thereby forming a path that links the inside of the valve-opening pressure chamber 34 to the atmosphere, and effecting pressure release from the valve-opening pressure chamber 34.

In this state, the forces described below act upon the valve element 31 of the humidification M bypass valve 30. Firstly, if the discharge pressure from the air compressor (AP in FIG. 1) is termed $P_1$ and the surface area of the diaphragm 32 is termed $A_1$, then because the valve-closing pressure chamber 33 and the fluid flow path (symbol 20 in FIG. 1) are connected, the inside of the valve-closing pressure chamber 33 is pressurized to a pressure of $P_1$, and a downward force of $P_1 A_1$ acts upon the valve element 31 via the diaphragm 32.

Further, because air (pressure $P_1$) enters the valve from the inlet 36 of the humidification M bypass valve 30 and applies pressure directly to the valve element 31, if the pressure-bearing surface area of the valve element 31 is termed $A_2$, then an upward force of $P_1 A_2$ also acts upon the valve element 31. Furthermore, the springs 35 cause a downward force $F_S$ to act on the valve element 31 via the diaphragm 32.

Accordingly, in order to move the valve element 31 downward and close the valve, the relationship between the upward and downward forces acting upon the valve element 31 must satisfy the expression:

$$F_S + P_1 A_1 > P_1 A_2 \qquad (4).$$

The air discharge pressure $P_1$ or the like is set so as to ensure that the relationship of formula (4) is satisfied. Alternatively, the drive demand pressure for driving the humidification M bypass valve 30 may be set so as to ensure that the relationship of formula (4) is satisfied, and the air discharge pressure P1 then controlled so as to achieve the drive demand pressure.

In FIG. 4 and FIG. 5, a humidification M bypass valve 30 having two pressure chambers was described, but for example, a valve having only the valve-opening pressure chamber 34 may also be used. In this configuration, to open the humidification M bypass valve 30, the valve-opening pressure chamber 34 is pressurized to achieve a force relationship that moves the valve element 31 upward, whereas to close the humidification M bypass valve 30, the pressure is released from the valve-opening pressure chamber 34, and the force of the springs 35 and the like generates a force relationship that moves the valve element 31 downward.

As described above, in the fuel cell system illustrated in FIG. 1, the humidification M bypass valve 30, the inlet shutoff valve 40A and the outlet shutoff valve 40B that function as fluid control valves are opened and closed using the air pressure inside the fluid flow path 20.

The air pressure inside the fluid flow path 20 normally has a control target value that is set to a demand pressure required by the fuel cell stack 10. For example, during the operation for generating electric power using the fuel cell stack 10, the air pressure inside the fluid flow path 20 is controlled so as to achieve a target value for the back pressure of the fuel cell stack 10. However, during valve opening of a fluid control valve, the air pressure inside the fluid flow path 20 is preferably a drive demand pressure required for driving the fluid control valve. Accordingly, in the present embodiment, the control target value for the pressure of the air flowing through the fluid flow path 20 is switched appropriately in accordance with the timing of the opening and closing operations for the fluid control valves.

Figure 6:
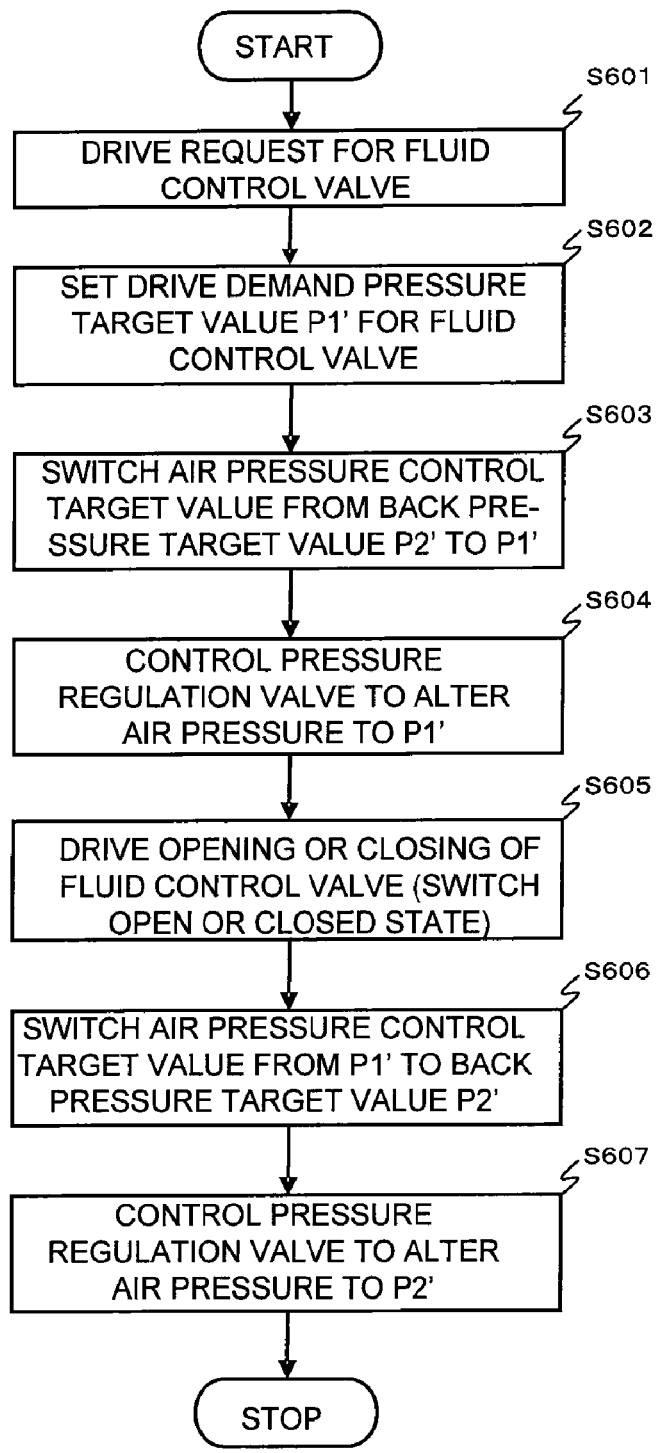
FIG. 6 is a diagram describing a switching operation for the control target value for the air pressure.

FIG. 6 is a flowchart describing a switching operation for the control target value for the air pressure. A description of the processing content of each step in the flowchart of FIG. 6 is provided below. In the following description, members (structures)) illustrated in FIG. 1 are referred to using the symbols used in FIG. 1.

When a drive request for a fluid control valve (the humidification M bypass valve 30, the inlet shutoff valve 40A, or the outlet shutoff valve 40B) is received in a state where the air pressure inside the fluid flow path 20 has been controlled so as to generate a back pressure target value P2' for the fuel cell stack 10 (S601), the control unit that controls the fuel cell system sets a drive demand pressure target value P1' for the fluid control valve (S602). For example, a drive demand pressure target value P1' required for driving the fluid control valve is set so as to satisfy one of the force relationship formulas (1) to (4) described above using FIG. 3 to FIG. 5.

Subsequently, the control unit switches the control target value for the air pressure from the back pressure target value P2' to the drive demand pressure target value P1' required for driving the fluid control valve (S603), and then, for example, regulates the degree of valve opening of the air pressure regulation valve 90 to alter the air pressure to the target value P1' (S604). The air pressure may also be controlled by the degree of valve opening of the fuel cell bypass valve 80 or the air flow rate from the air compressor AP. By controlling the air pressure, the air pressure can be adjusted to the drive demand pressure target value P1' for the fluid control valve, meaning the fluid control valve can be driven reliably, thereby switching the open or closed state of the valve (S605).

Once the open or closed state of the fluid control valve has been switched, the control unit switches the control target value for the air pressure from the drive demand pressure target value P1' for the fluid control valve to the back pressure target value P2' (S606), and then, for example, regulates the degree of valve opening of the air pressure regulation valve 90 to alter the air pressure to the target value P2' (S607). As a result, the back pressure inside the fuel cell stack 10 is restored to the back pressure target value P2' that is ideal for operation of the fuel cell stack 10.

The back pressure target value P2' for the fuel cell stack 10 is set in accordance with factors such as the structure of the fuel cell stack 10, and is set, for example, to a value of 120 kilopascals or the like. Further, the drive demand pressure target value P1' for the fluid control valve is set in accordance with factors such as the structure of the fluid control valve, and is set, for example, to a value of 140 kilopascals or the like.

In this manner, in the present embodiment, during driving of a fluid control valve, the drive demand pressure for the fluid control valve is given priority over the back pressure target value required by the fuel cell stack 10, and the pressure of the fluid flowing through the fluid flow path 20 is regulated based on the drive demand pressure.

The open or closed states of the fluid control valves of the fuel cell system illustrated in FIG. 1 are determined in accordance with the system state, such as the normal operating state where the fuel cell stack 10 is generating electric power, a purging state for purging the fuel cell stack 10, or a stopped state where operation of the fuel cell system is stopped. When, for example, the system state transitions from the normal operating state to the purging state, or transitions from the purging state to the stopped state, or transitions from the stopped state to the normal operating state, the open or closed states of the fluid control valves are switched appropriately. In the present embodiment, during these transitions between each of the system states, the drive demand pressure for the fluid control valves is given priority, and the pressure of the fluid flowing through the fluid flow path 20 is regulated based on the drive demand pressure.

Figure 7:
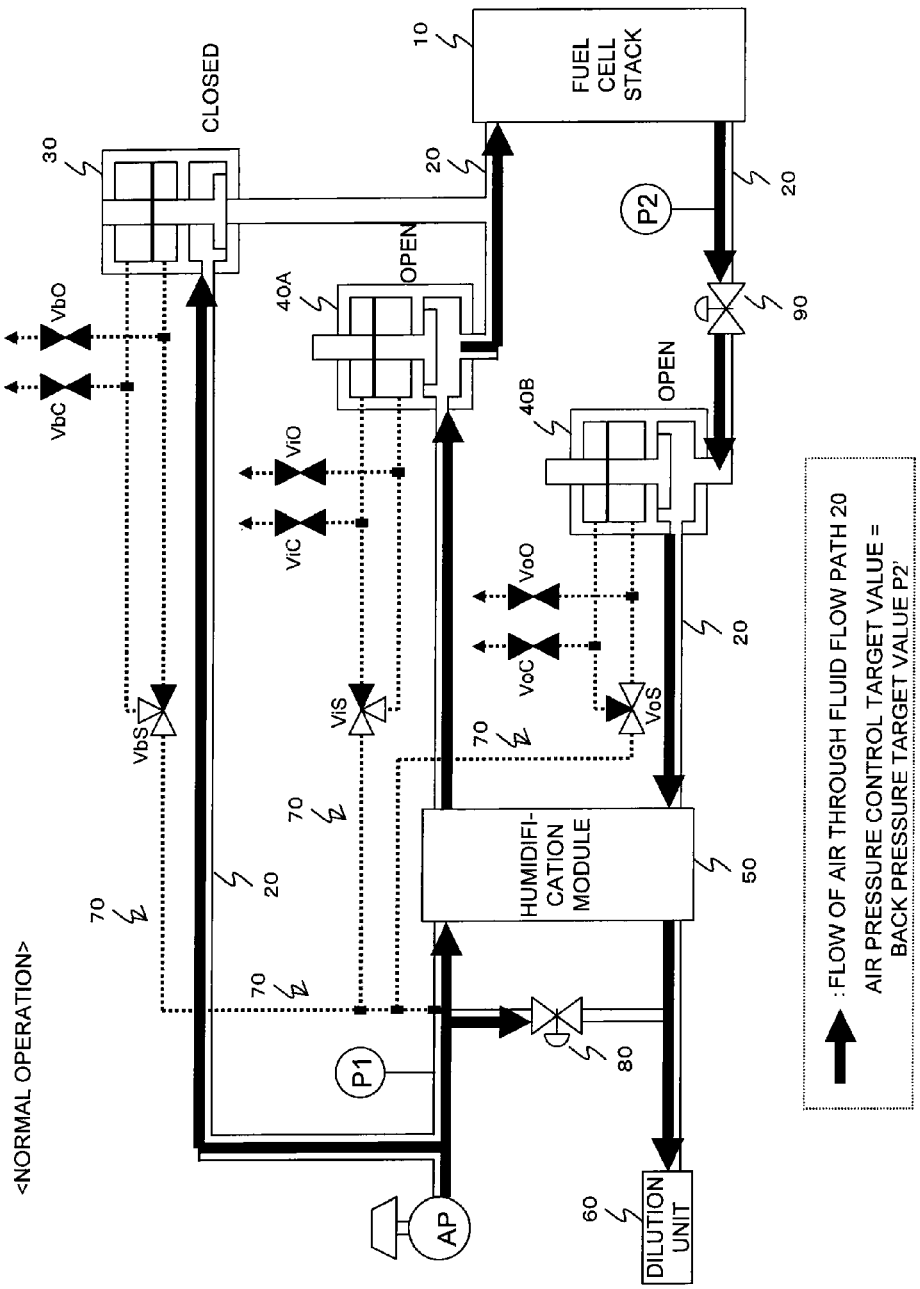
FIG. 7 is a diagram describing the state during normal operation of the fuel cell system.
Figure 8:
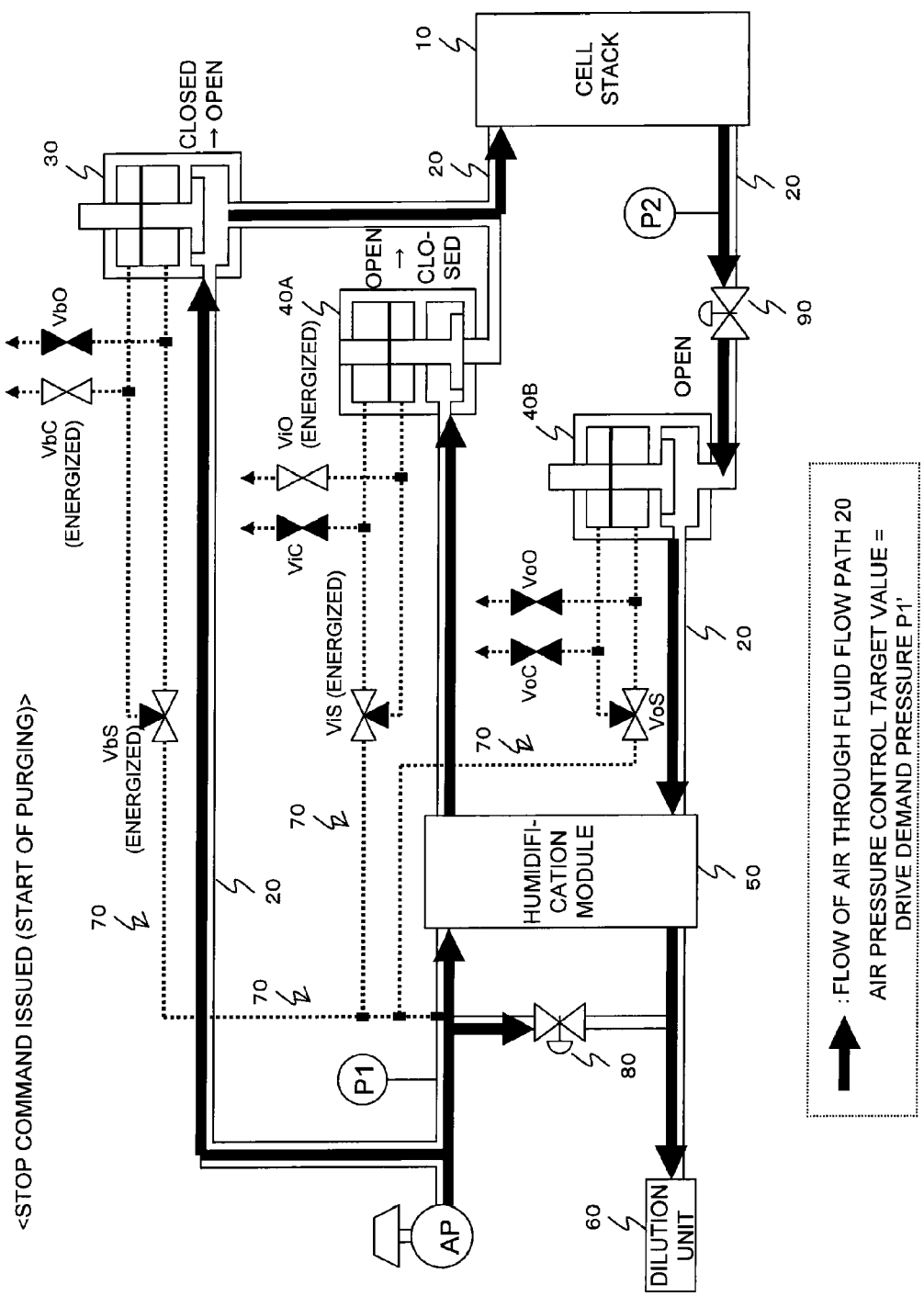
FIG. 8 is a diagram describing the state when a stop command is issued in the fuel cell system.
Figure 9:
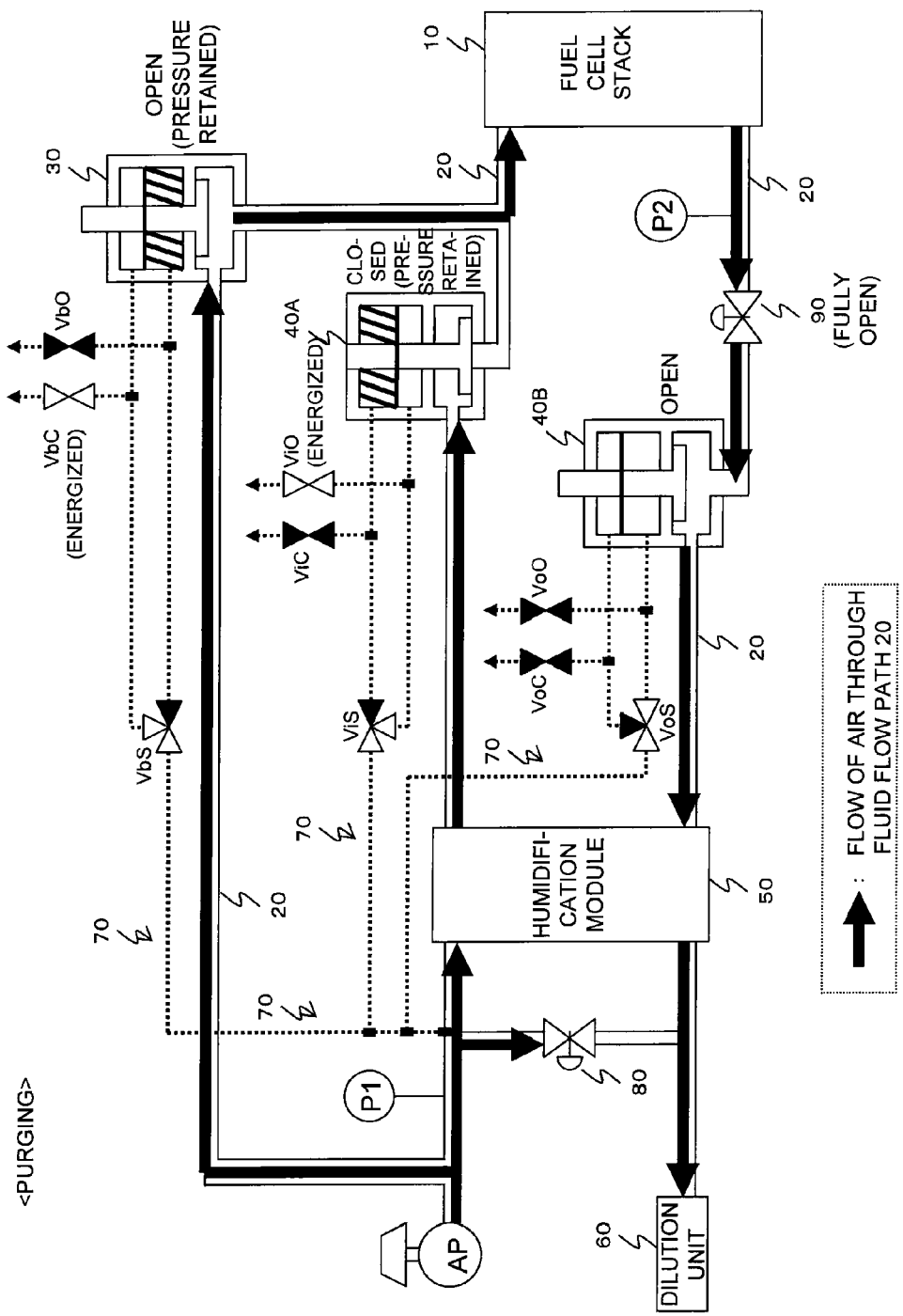
FIG. 9 is a diagram describing the state during purging of the fuel cell system.

The control of each of the valves when the fuel cell system of FIG. 1 transitions from the state that exists during normal operation to the state that exists during purging is described below using FIG. 7 to FIG. 9. FIG. 7 to FIG. 9 each represents a diagram in which the flow of air within the fluid flow path 20 is shown for the overall structural diagram of the fuel cell system illustrated in FIG. 1. Accordingly, descriptions are omitted for those members (structures) that have already been described using FIG. 1.

FIG. 7 is a diagram describing the state during normal operation of the fuel cell system of FIG. 1. During normal operation, the fuel cell system uses the fuel cell stack 10 to generate electric power. In other words, humidified air is supplied to the fuel cell stack 10, and reacted air is discharged from the fuel cell stack 10.

During normal operation, the humidification M bypass valve 30 is closed, whereas the inlet shutoff valve 40A and the outlet shutoff valve 40B are both open. Further, the air compressor (AP) is in operation, and the air discharged from the air compressor is supplied to the humidification module 50, the humidification M bypass valve 30, and the fuel cell bypass valve 80.

The air supplied from the air compressor to the humidification module 50 is humidified by the humidification module 50, and then passes through the open inlet shutoff valve 40A and is supplied to the fuel cell stack 10. The air supplied from the air compressor to the humidification M bypass valve 30 is blocked because the humidification M bypass valve 30 is closed. Similarly, the fuel cell bypass valve 80 is also closed, which blocks the flow of air.

The reacted air discharged from the fuel cell stack 10 passes through the air pressure regulation valve 90 that regulates the back pressure and the open outlet shutoff valve 40B, and then through the humidification module 50 and the dilution unit 60, before being released into the atmosphere.

During normal operation, the valves ViS, ViC and ViO that control the inlet shutoff valve 40A are all in unenergized states. In other words, the valve-opening pressure chamber (symbol 44 in FIG. 2) is selected by ViS, and ViC and ViO are both closed. In this state, the valve-opening pressure chamber of the inlet shutoff valve 40A is pressurized by the pressure of the air discharged from the air compressor, and a force is applied to the valve element (symbol 41 in FIG. 2) in the valve-opening direction. Furthermore, the springs (symbol 45 in FIG. 2) inside the inlet shutoff valve 40A also apply a force to the valve element in the valve-opening direction, and the air that enters from the inlet (symbol 46 in FIG. 2) of the inlet shutoff valve 40A also applies a force to the valve element in the valve-opening direction. As a result, although ViS, ViC and ViO are all in unenergized states, the inlet shutoff valve 40A can be maintained in an open state, namely its normal state.

Furthermore, during normal operation, the valves VoS, VoC and VoO that control the outlet shutoff valve 40B are also all in unenergized states. Hence, for the same reasons as those described for the inlet shutoff valve 40A, the outlet shutoff valve 40B can be maintained in an open state, namely the normal state, even though VoS, VoC and VoO are all in unenergized states.

Moreover, during normal operation, the valves VbS, VbC and VbO that control the humidification M bypass valve 30 are all in unenergized states. In other words, the valve-closing pressure chamber (symbol 33 in FIG. 4) is selected by VbS, and VbC and VbO are both closed. In this state, the valve-closing pressure chamber of the humidification M bypass valve 30 is pressurized by the pressure of the air discharged from the air compressor, and a force is applied to the valve element (symbol 31 in FIG. 4) in the valve-closing direction. Furthermore, the springs (symbol 35 in FIG. 4) inside the humidification M bypass valve 30 also apply a force to the valve element in the valve-closing direction, and the air that enters from the inlet (symbol 36 in FIG. 4) of the humidification M bypass valve 30 also applies a force to the valve element in the valve-closing direction. As a result, although VbS, VbC and VbO are all in unenergized states, the humidification M bypass valve 30 can be maintained in a closed state, namely its normal state.

During normal operation, the pressure of the air flowing through the fluid flow path 20 is controlled so as to achieve a target value for the back pressure of the fuel cell stack 10. In other words, the control target value for the air pressure is set to the back pressure target value P2', and the degree of valve opening of the air pressure regulation valve 90 is regulated so that the air pressure becomes P2'. The air pressure may also be controlled by using the degree of valve opening of the fuel cell bypass valve 80 and/or the air flow rate from the air compressor AP.

FIG. 8 is a diagram describing the state when a stop command is issued in the fuel cell system of FIG. 1. This state describes a state where, for example, from the normal operation state (FIG. 7), a user or the like executes an operation for stopping the operation of the fuel cell system.

When a stop operation is executed, the fuel cell system conducts a series of operations to prepare for purging. In other words, the state shown in FIG. 8 corresponds with the state at the start of purging. At the start of purging, the humidification M bypass valve 30 is switched from a closed state to an open state. The operation for opening the humidification M bypass valve 30 is as described above (see FIG. 5). Namely, VbS is energized, thereby connecting the valve-opening pressure chamber (symbol 34 in FIG. 5) and the fluid flow path 20. Further, VbO remains in an unenergized state, so that the path linking the valve-opening pressure chamber with the atmosphere remains blocked. VbC is energized, effecting pressure release from the valve-closing pressure chamber (symbol 33 in FIG. 5). As a result, the humidification M bypass valve 30 is opened. When the humidification M bypass valve 30 is opened, air discharged from the air compressor is supplied to the fuel cell stack 10 via the humidification M bypass valve 30.

Furthermore, at the start of purging, the inlet shutoff valve 40A is switched from an open state to a closed state. The operation for closing the inlet shutoff valve 40A is as described above (see FIG. 3). Namely, ViS is energized, thereby connecting the valve-closing pressure chamber (symbol 43 in FIG. 3) and the fluid flow path 20. Further, ViC remains in an unenergized state, so that the path linking the valve-closing pressure chamber with the atmosphere remains blocked. ViO is energized, effecting pressure release from the valve-opening pressure chamber (symbol 44 in FIG. 3). When the inlet shutoff valve 40A is closed, the flow air of air that was supplied to the fuel cell stack 10 via the inlet shutoff valve 40A is blocked.

When the stop command is issued, the outlet shutoff valve 40B remains in an open state, the same state as that used during normal operation (see FIG. 7). Furthermore, the valves VoS, VoC and VoO that control the outlet shutoff valve 40B all remain in unenergized states.

At the start of purging, the pressure of the air flowing through the fluid flow path 20 is controlled so as to achieve a drive demand pressure for the fluid control valves (the humidification M bypass valve 30, the inlet shutoff valve 40A and the outlet shutoff valve 40B). In other words, the control target value for the air pressure is set to the drive demand pressure target value P1', and the degree of valve opening of the air pressure regulation valve 90 is regulated so that the air pressure becomes P1'. That is, the air pressure regulation valve 90 is narrowed, thus raising the air pressure. The air pressure may also be controlled by using the degree of valve opening of the fuel cell bypass valve 80 and/or the air flow rate from the air compressor AP.

FIG. 9 is a diagram describing the state during purging of the fuel cell system of FIG. 1. Purging is executed, for example, to discharge generated water and the like from inside the fuel cell stack 10. In other words, air is supplied to the fuel cell stack 10 without undergoing humidification, and the generated water and the like is discharged from the fuel cell stack 10 together with the air.

During purging, the humidification M bypass valve 30 is maintained in an open state. In the present embodiment, in order to maintain the humidification M bypass valve 30 in an open state, the valve-opening pressure chamber (symbol 34 in FIG. 4) is sealed, thereby maintaining the pressure inside the valve-opening pressure chamber. The operation for maintaining the pressure and sealing the valve-opening pressure chamber is as described below.

First, from the state at the start of purging (FIG. 8), namely from the state where the pressure of the air flowing through the fluid flow path 20 is controlled so as to achieve the drive demand pressure target value P1', thereby pressurizing the valve-opening pressure chamber of the humidification M bypass valve 30 to the pressure P1', energization of the valve VbS is stopped. As a result, the pressure control path 70 linked to the valve-opening pressure chamber of the humidification M bypass valve 30 is blocked. At this time, VbO is in an unenergized state, meaning the path linking the valve-opening pressure chamber of the humidification M bypass valve 30 with the atmosphere is also blocked. Accordingly, the valve-opening pressure chamber of the humidification M bypass valve 30 is sealed in a state that maintains a pressurized state at the pressure P1'. The valve VbC is in an energized state, meaning pressure is released from the valve-closing pressure chamber of the humidification M bypass valve 30.

As a result, the pressure difference between the inside of the valve-closing pressure chamber and the inside of the valve-opening pressure chamber within the humidification M bypass valve 30 applies a force to the valve element (symbol 31 in FIG. 4) in the valve-opening direction, and that force is larger than the force applied by the springs (symbol 35 in FIG. 4) and the like, meaning the open state of the humidification M bypass valve 30 is maintained.

Furthermore, during purging, the inlet shutoff valve 40A is maintained in a closed state. In the present embodiment, in order to maintain the shutoff valve 40A in a closed state, the valve-closing pressure chamber (symbol 43 in FIG. 2) is sealed, thereby maintaining the pressure inside the valve-closing pressure chamber. The operation for maintaining the pressure and sealing the valve-closing pressure chamber is as described below.

First, from the state at the start of purging (FIG. 8), namely from the state where the pressure of the air flowing through the fluid flow path 20 is controlled so as to achieve the drive demand pressure target value P1', thereby pressurizing the valve-opening pressure chamber of the humidification M bypass valve 30 to the pressure P1', energization of the valve ViS is stopped. As a result, the pressure control path 70 linked to the valve-closing pressure chamber of the inlet shutoff valve 40A is blocked. At this time, ViC is in an unenergized state, meaning the path linking the valve-closing pressure chamber of the inlet shutoff valve 40A with the atmosphere is also blocked. Accordingly, the valve-closing pressure chamber of the inlet shutoff valve 40A is sealed in a state that maintains a pressurized state at the pressure P1'. The valve ViO is in an energized state, meaning pressure is released from the valve-opening pressure chamber of the inlet shutoff valve 40A.

As a result, the pressure difference between the inside of the valve-closing pressure chamber and the inside of the valve-opening pressure chamber within the inlet shutoff valve 40A applies a force to the valve element (symbol 41 in FIG. 2) in the valve-closing direction, and that force is larger than the force applied by the springs (symbol 45 in FIG. 3) and the like, meaning the closed state of the inlet shutoff valve 40A is maintained.

Purging is executed, for example, to discharge generated water and the like from inside the fuel cell stack 10. In order to achieve efficient discharge of the generated water and the like, the air pressure regulation valve 90 is preferably opened fully during purging. However, if the degree of valve opening of the air pressure regulation valve 90 is switched from a narrowed state to a fully open state, then the pressure of the air flowing through the fluid flow path 20 will decrease.

However, in the present embodiment, the valve-opening pressure chamber of the humidification M bypass valve 30 is sealed to maintain the open state of the humidification M bypass valve 30, and the valve-closing pressure chamber of the inlet shutoff valve 40A is sealed to maintain the closed state of the inlet shutoff valve 40A. As a result, even if the pressure of the air flowing through the fluid flow path 20 decreases, the open state of the humidification M bypass valve 30 and the closed state of the inlet shutoff valve 40A can be retained.

Accordingly, in the present embodiment, at the start of purging (FIG. 8), the degree of valve opening of the air pressure regulation valve 90 or the like is regulated so that the air pressure temporarily reaches the pressure P1', and the open or closed state of the humidification M bypass valve 30 and the inlet shutoff valve 40A are switched. Subsequently, during purging, the air pressure regulation valve 90 can be moved to a fully open or nearly fully open state to conduct purging.

During purging, the outlet shutoff valve 40B remains in an open state, the same state as that at the time of the stop command (see FIG. 8). The valves VoS, VoC and VoO that control the outlet shutoff valve 40B all remain in unenergized states. Because the outlet shutoff valve 40B is open, air discharged from the fuel cell stack 10 passes through the air pressure regulation valve 90 and the open outlet shutoff valve 40B, and then through the humidification module 50 and the dilution unit 60, before being released into the atmosphere.

A preferred embodiment of the present invention is described above, but the above embodiment is merely exemplary in all respects, and in no way limits the scope of the present invention. The present invention includes all manner of modified embodiments provided they do not depart from the essence of the invention.

The invention claimed is:

1. A fuel cell system comprising:
   a fuel cell;
   a fluid flow path connected to the fuel cell;
   a fluid control valve provided within the fluid flow path, the fluid control valve including a diaphragm, a first pressure chamber on a first side of the diaphragm, and a second pressure chamber on an opposing side of the diaphragm and
   a three-way valve in fluid communication with both the first and second pressure chambers of the fluid control valve and the fluid flow path,
   wherein the fluid control valve is a valve that is opened and closed using a pressure of a fluid flowing through the fluid flow path, and the first pressure chamber of the fluid control valve is sealed to maintain the open or closed state of the fluid control valve by using a pressure inside the first pressure chamber, and
   wherein a control unit regulates the pressure of the fluid flowing through the fluid flow path based on a drive demand pressure that is required for driving the fluid control valve.

2. The fuel cell system according to claim 1, wherein the control unit regulates the pressure of the fluid flowing through the fluid flow path based on a drive demand pressure that is commensurate with a pressure inside the fuel cell when the fluid control valve is opened.

3. The fuel cell system according to claim 1, wherein
   the control unit regulates the pressure of the fluid flowing through the fluid flow path based on a cell demand pressure that is required by the fuel cell and the drive demand pressure, and
   the control unit also gives the drive demand pressure priority over the cell demand pressure during driving of the fluid control valve, so that the pressure of the fluid flowing through the fluid flow path is regulated based on the drive demand pressure.

4. The fuel cell system according to claim 3, wherein
   the control unit gives the drive demand pressure priority over the cell demand pressure when purging of the fuel cell is started, so that the pressure of the fluid flowing through the fluid flow path is regulated based on the drive demand pressure, and the fluid control valve is switched to an open or closed state that is appropriate for purging.

5. The fuel cell system according to claim 4, wherein
   the control unit seals the second pressure chamber of the fluid control valve following switching of the fluid control valve to an open or closed state that is appropriate for purging is sealed, and the open or closed state of the fluid control valve is maintained using a pressure inside the second pressure chamber.

6. The fuel cell system according to claim 1, further comprising:
   a compressor that circulates a fluid through the fluid flow path, and
   a pressure regulation valve provided within the fluid flow path,
   wherein the control unit regulates the pressure of the fluid flowing through the fluid flow path by at least one of a discharge flow rate from the compressor and a degree of valve opening of the pressure regulation valve.

* * * * *

UNITED STATES PATENT AND TRADEMARK OFFICE
CERTIFICATE OF CORRECTION

PATENT NO. : 8,252,472 B2
APPLICATION NO. : 12/447323
DATED : August 28, 2012
INVENTOR(S) : Yasuhiro Osada et al.

It is certified that error appears in the above-identified patent and that said Letters Patent is hereby corrected as shown below:

IN THE SPECIFICATIONS:

Column 9, line 64, change "and an downward" to --and a downward--;

Column 13, line 7, change "(structure))" to --(structures)--;

IN THE CLAIMS:

Column 18, in claim 5, line 49, change "purging is sealed" to --purging, and--.

Signed and Sealed this
Nineteenth Day of March, 2013

Teresa Stanek Rea
*Acting Director of the United States Patent and Trademark Office*